(12) United States Patent
Inamasa et al.

(10) Patent No.: US 11,557,894 B2
(45) Date of Patent: Jan. 17, 2023

(54) PROTECTION RELAY DEVICE AND POWER CONVERSION SYSTEM

(71) Applicant: TOSHIBA MITSUBISHI-ELECTRIC INDUSTRIAL SYSTEMS CORPORATION, Chuo-ku (JP)

(72) Inventors: Keisuke Inamasa, Tokyo (JP); Kenji Uetani, Tokyo (JP); Mitsuru Hano, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 232 days.

(21) Appl. No.: 17/043,158

(22) PCT Filed: Feb. 28, 2019

(86) PCT No.: PCT/JP2019/007875
§ 371 (c)(1),
(2) Date: Sep. 29, 2020

(87) PCT Pub. No.: WO2020/174668
PCT Pub. Date: Sep. 3, 2020

(65) Prior Publication Data
US 2021/0151980 A1 May 20, 2021

(51) Int. Cl.
*H02B 1/38* (2006.01)
*H02H 7/10* (2006.01)
(Continued)

(52) U.S. Cl.
CPC .............. *H02H 7/10* (2013.01); *H01H 85/38* (2013.01); *H01H 85/43* (2013.01); *H02B 1/18* (2013.01);
(Continued)

(58) Field of Classification Search
CPC .. H01H 39/006; H01H 85/02; H01H 85/0241; H01H 85/205; H01H 85/04;
(Continued)

(56) References Cited

U.S. PATENT DOCUMENTS 8,941,960 B2    1/2015 Murray
2005/0033479 A1*  2/2005 Parker ................. F16K 37/0075
                                                      700/282

FOREIGN PATENT DOCUMENTS

CN    104051199 B    3/2017
JP    62-217811 A    9/1987
(Continued)

OTHER PUBLICATIONS

Indian Examination Report dated Dec. 31, 2020 in Indian Patent Application No. 202017025794, 4 pages.
(Continued)

*Primary Examiner* — Bryan R Perez
(74) *Attorney, Agent, or Firm* — Oblon, McClelland, Maier & Neustadt, L.L.P.

(57) ABSTRACT

A protection relay device includes a housing and a fuse unit. The fuse unit includes a connection conductor, an input conductor connected to the connection conductor and receiving an external power, a fuse connected to the connection conductor, and an external device connection conductor connected to the fuse on a side opposite to the input conductor, and to which an external device is connected. A short-circuit induction conductor is provided on at least one of the input conductor on a side opposite to the fuse and the flapper portion, the short-circuit induction conductor protruding toward the other of the input conductor and the flapper portion.

6 Claims, 6 Drawing Sheets

(51) Int. Cl.
*H01H 85/38* (2006.01)
*H01H 85/43* (2006.01)
*H02B 1/18* (2006.01)
*H01H 85/20* (2006.01)

(52) U.S. Cl.
CPC ............ *H02B 1/38* (2013.01); *H01H 85/205* (2013.01); *H01H 2085/385* (2013.01)

(58) Field of Classification Search
CPC ............ H01H 85/2035; H01H 85/044; H01H 85/2045; H01H 85/38; H01H 9/104; H02B 1/18
See application file for complete search history.

(56) References Cited

FOREIGN PATENT DOCUMENTS

| | | |
|---|---|---|
| JP | 10-285719 A | 10/1998 |
| JP | 11-341625 A | 12/1999 |
| JP | 2011-223721 A | 11/2011 |
| JP | 2012-143136 A | 7/2012 |
| JP | 2016-82626 A | 5/2016 |
| JP | 2016-192837 A | 11/2016 |

OTHER PUBLICATIONS

International Search Report dated Jun. 4, 2019 in PCT/JP2019/007875 dated Feb. 28, 2019, 2 pages.

\* cited by examiner

PROTECTION RELAY DEVICE AND POWER CONVERSION SYSTEM

TECHNICAL FIELD

Embodiments of the present invention relate to a protection relay device and a power conversion system.

BACKGROUND ART

Conventionally, it is known to provide a protective relay such as a fuse between an external power supply and a circuit so that a current exceeding a predetermined value does not flow through a circuit such as a power conversion system. With this configuration, when a current equal to or more than a predetermined value attempts to enter the circuit, the external power supply and the circuit are cut off by the protection relay. Therefore, the circuit can be protected.

By the way, in a large-scale power conversion system, an inrush current larger than a predetermined value can flow. When a large inrush current flows, the protection relay cannot be set accurately, and high incident energy is generated. Thereby, an arc flash may occur.

In recent years, as a measure against the arc flash, a power conversion system that satisfies the arc flash standard has been desired. However, when the power conversion system is simply designed to satisfy the standard relating to the arc flash, there has been a problem that the feasibility is poor, for example, the entire system is unnecessarily enlarged in order to secure the strength of the housing.

PRIOR ART DOCUMENTS

Patent Document

[Patent Document 1]
Japanese Unexamined Patent Application, First Publication No. 2016-82626
[Patent Document 2]
Japanese Unexamined Patent Application, First Publication No. 2016-192837

SUMMARY OF INVENTION

Problems to be Solved by the Invention

The problem to be solved by the present invention is to provide a protection relay device and a power conversion system that can easily satisfy the standard for arc flash and can reduce the size of the entire system.

Means for Solving the Problems

The protection relay device of the embodiment includes a housing and a fuse unit. The fuse unit includes a connection conductor, an input conductor connected to the connection conductor and receiving an external power, a fuse connected to the connection conductor, and an external device connection conductor connected to the fuse on a side opposite to the input conductor, and to which an external device is connected. A short-circuit induction conductor is provided on at least one of the input conductor on a side opposite to the fuse and the flapper portion, the short-circuit induction conductor protruding toward the other of the input conductor and the flapper portion.

DESCRIPTION OF EMBODIMENTS

Hereinafter, a protection relay device and a power conversion system according to an embodiment will be described with reference to the drawings.

Figure 1:
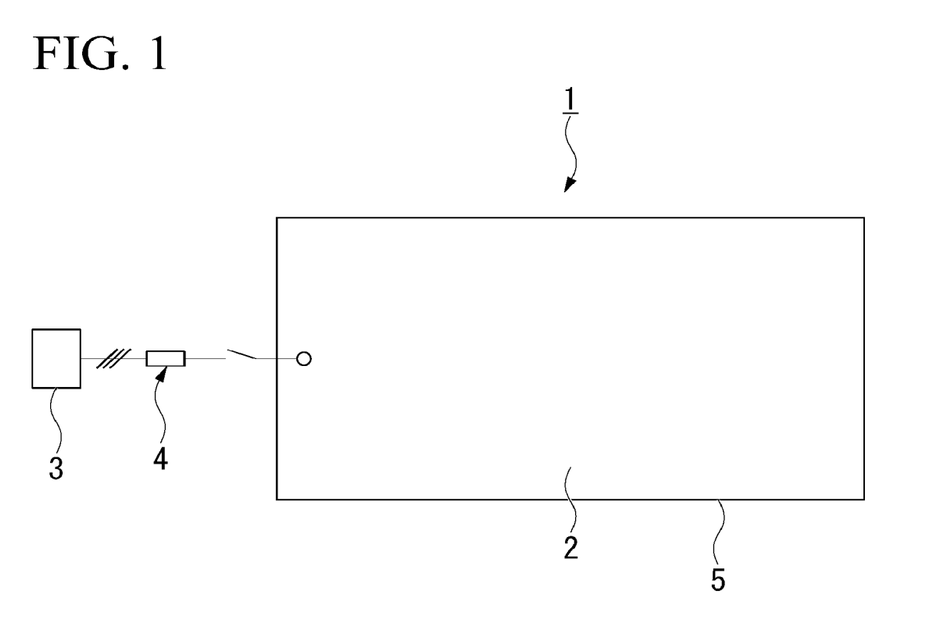
FIG. 1 is a schematic configuration diagram of a power conversion system according to an embodiment.

FIG. 1 is a schematic configuration diagram of the power conversion system 1.

As shown in FIG. 1, the power conversion system 1 includes a power conversion device 2, an external power supply 3 that supplies power to the power conversion device 2, and a protection relay device 4 provided between the power conversion device 2 and the external power supply 3 and configured to prevent an overcurrent to the power conversion device 2.

The external power supply 3 supplies, for example, three-phase alternating current (U-phase, V-phase, W-phase) power to the power converter 2.

The power conversion device 2 includes, for example, at least one of a converter and an inverter (both are not shown) in the housing 5. The converter converts AC power to DC power. The inverter converts DC power to AC power.

The protection relay device 4 is provided separately from the power conversion device 2. The protection relay device 4 is provided so as to be separated from the power conversion device 2.

Figure 2:
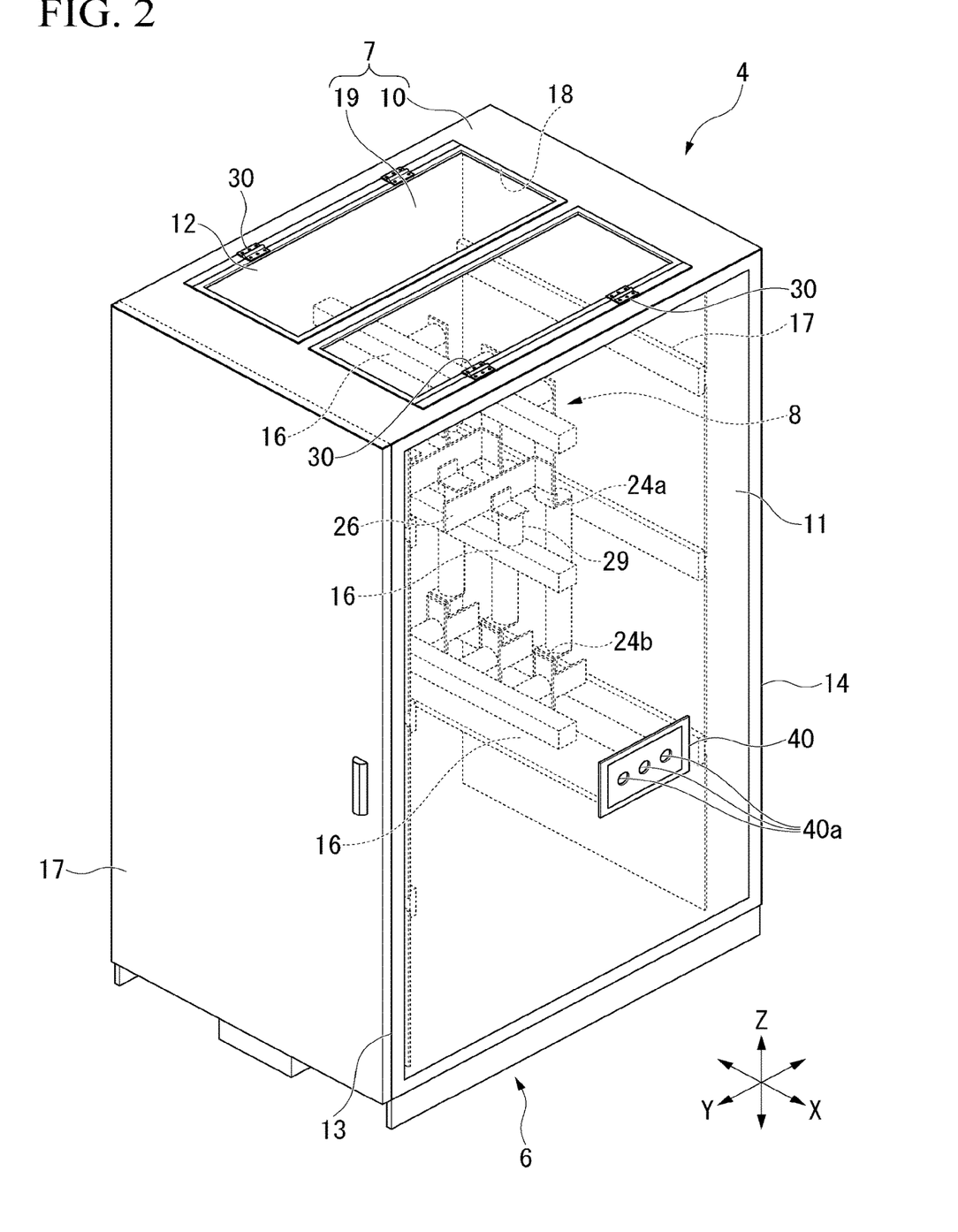
FIG. 2 is a perspective view of a protection relay device of the embodiment.

FIG. 2 is a perspective view of the protection relay device 4.

In the following description, the vertical direction when the protection relay device 4 is installed on the floor is referred to as a Z direction, and the horizontal plane is referred to as an X-Y plane (X direction, Y direction). In the following description, the up-down direction refers to an up-down direction when the protection relay device 4 is installed on the floor. That is, the upper part in the Z direction is an upper part in the vertical direction, and the lower part in the Z direction is a lower part in the vertical direction.

As shown in FIG. 2, the protection relay device 4 is provided in the metal housing 6 formed in a substantially rectangular parallelepiped shape that is long in the Z direction, a flapper portion 7 provided in the housing 6 to constitute a part of the housing 6, and a fuse unit 8 provided inside the housing 6.

The housing 6 has six wall surfaces (a bottom surface 9, a top plate 10, side surfaces 11, 12, a front surface 13, and a rear surface 14). The bottom surface 9 and the top plate 10 face each other in the Z direction, the bottom surface 9 is arranged below, and the top plate 10 is arranged above.

The side surfaces 11 and 12 face each other in the X direction. The front surface 13 and the rear surface 14 face each other in the Y direction. For example, the protection relay device 4 and the power converter 2 are arranged side by side in the X direction.

On one side surface 11 of the two side surfaces 11 and 12, an electric wire lead-out portion 40 is provided. The wire lead-out portion 40 is formed with three through-holes 40a communicating the inside and outside of the wire lead-out portion 40. For example, a grommet (not shown) is mounted in each through-hole 40a. An electric wire (not shown) is inserted into each through hole-40a through the grommet. The electric wire is, for example, a three-phase AC line. The protection relay device 4 and the power converter 2 are connected by these three-phase AC lines.

On the two side surfaces 11 and 12, beams (not shown) are provided in a lattice shape as a whole. The beams are for increasing the mechanical strength of the side surfaces 11 and 12. A plurality of (for example, three in the present embodiment) unit fixing bars 16 extending in the X direction are provided between the beams provided on the two side surfaces 11 and 12 so as to straddle these beams. The fuse unit 8 is fixed to each unit fixing bar 16.

The front surface 13 and the rear surface 14 are, for example, wall surfaces on which an operator works. Most of the front surface 13 and the rear surface 14 are largely open. The front surface 13 is provided with a door 17 that opens and closes an opening. The door 17 is opened and the operation inside the housing 6 is performed from the front. A cover (not shown) for closing the opening is provided on the rear surface 14. After removing the cover, work inside the housing 6 is performed from the rear surface.

The top plate 10 corresponds to a wall surface in the claims, and is arranged at the uppermost part of the housing 6. The height of the top plate 10 is, for example, the height of the position of the head of the operator. The top plate 10 forms a part of the flapper portion 7.

Figure 3:
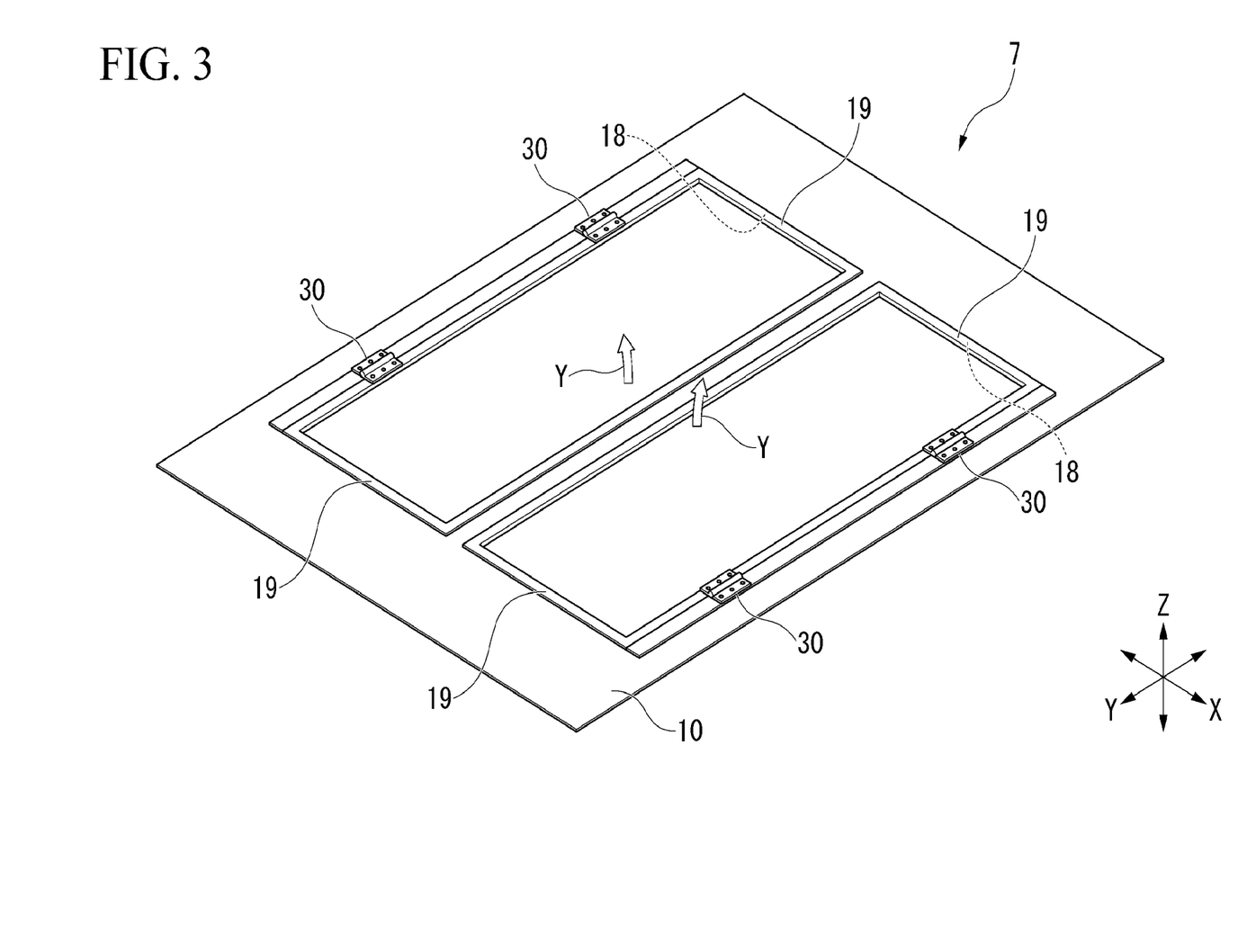
FIG. 3 is a perspective view of a flapper portion according to the embodiment.

FIG. 3 is a perspective view of the flapper portion 7.

As shown in FIGS. 2 and 3, a plurality of (for example, two in this embodiment) openings 18 are formed in the top plate 10. For example, two openings 18 are arranged side by side in the X direction. These openings 18 occupy most of the top plate 10. The top plate 10 is provided with a lid portion 19 that opens and closes the opening 18 at a position corresponding to each opening 18. The top plate 10 and the lid portion 19 constitute the flapper portion 7.

The lid portion 19 is a metal plate-shaped member formed so that its area is slightly larger than the opening area of the opening 18. The lid portion 19 is rotatably attached to the top plate 10 via a hinge 30.

The hinge portions 30 are arranged on both sides of the top plate 10 in the X direction. That is, the four lid portions 19 are rotated about both sides of the top plate 10 in the X direction. In other words, when the lid portion 19 is opened, the lid portion 19 opens from the center of the top plate 10 in the X direction.

The side of the lid portion 19 opposite to the hinge 30 in the X direction (the side on which the lid portion 19 opens) is fastened and fixed to the top plate 10 by a plastic screw (not shown). Therefore, the lid portion 19 is not inadvertently opened. The material strength of the lid portion 19 may be lower than the material strength of the top plate 10.

Figure 4:
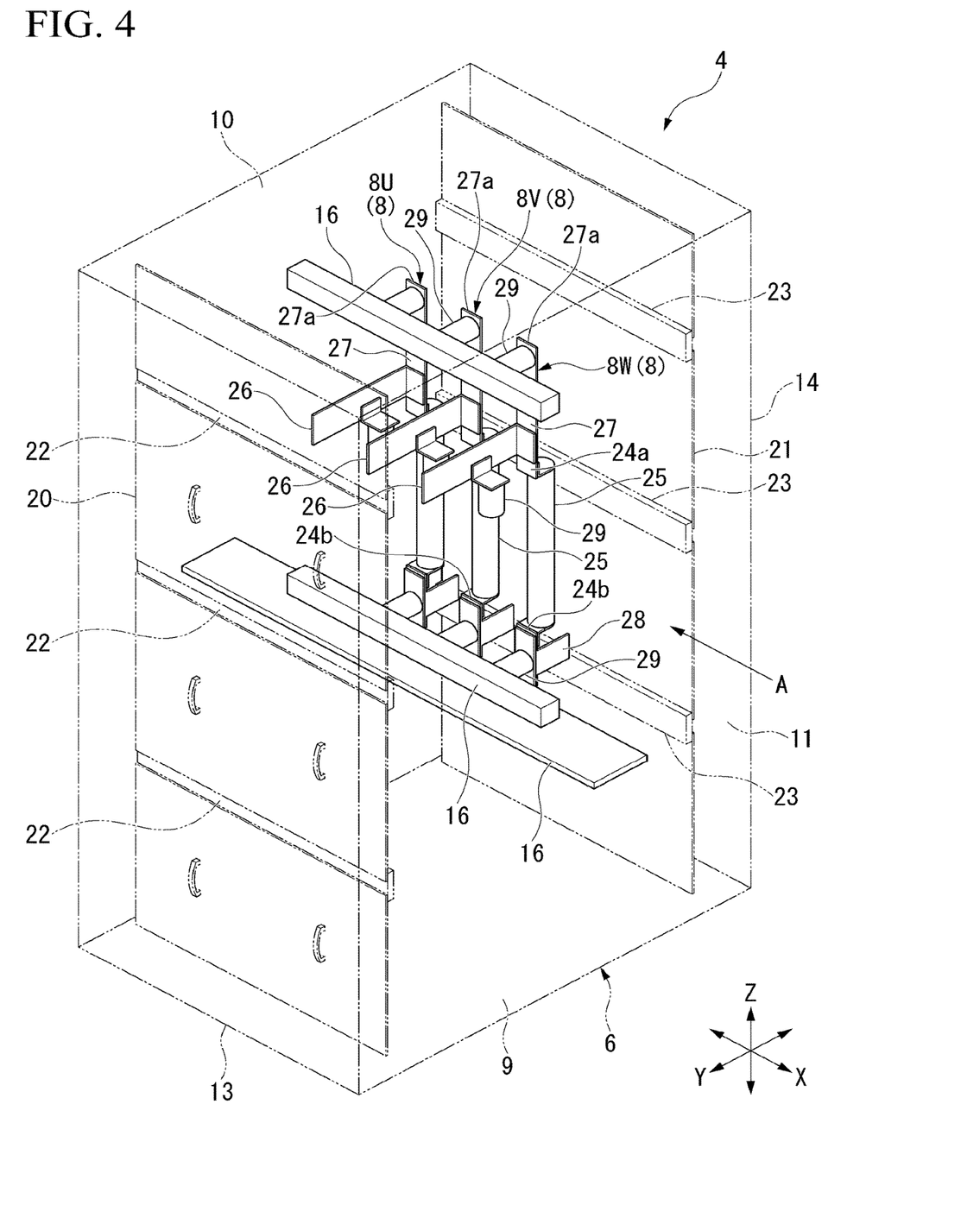
FIG. 4 is a perspective view which penetrates the housing of the protection relay device according to the embodiment.

FIG. 4 is a perspective view of the protection relay device 4 through the housing 6. In FIG. 4, six wall surfaces (a bottom surface 9, a top plate 10, side surfaces 11 and 12, a front surface 13, and a rear surface 14) of the housing 6 are simplified for easy understanding.

As shown in FIG. 4, inside the housing 6, a metal front inner cover 20 is provided inside the front surface 13 in the Y direction. Inside the housing 6, a metal rear inner cover 21 is provided inside the rear surface 14 in the Y direction. The front inner cover 20 and the rear inner cover 21 are explosion-proof protective covers.

The front inner cover 20 is provided on the entire X-Z plane in the housing 6. A plurality of (three in this embodiment) beams 22 are provided on the front inner cover 20 at equal intervals in the Z direction. The beam 22 extends in the entire X direction of the front inner cover 20. The beam 22 is for increasing the mechanical strength of the front inner cover 20.

The rear inner cover 21 is provided on the entire X-Z plane in the housing 6. The rear inner cover 21 is provided with a plurality of (three in this embodiment) beams 23 at equal intervals in the Z direction. The beam 23 extends in the entire X direction of the rear inner cover 21. The beam 23 is for increasing the mechanical strength of the rear inner cover 21.

The fuse unit 8 is arranged between the front inner cover 20 and the rear inner cover 21.

Figure 5:
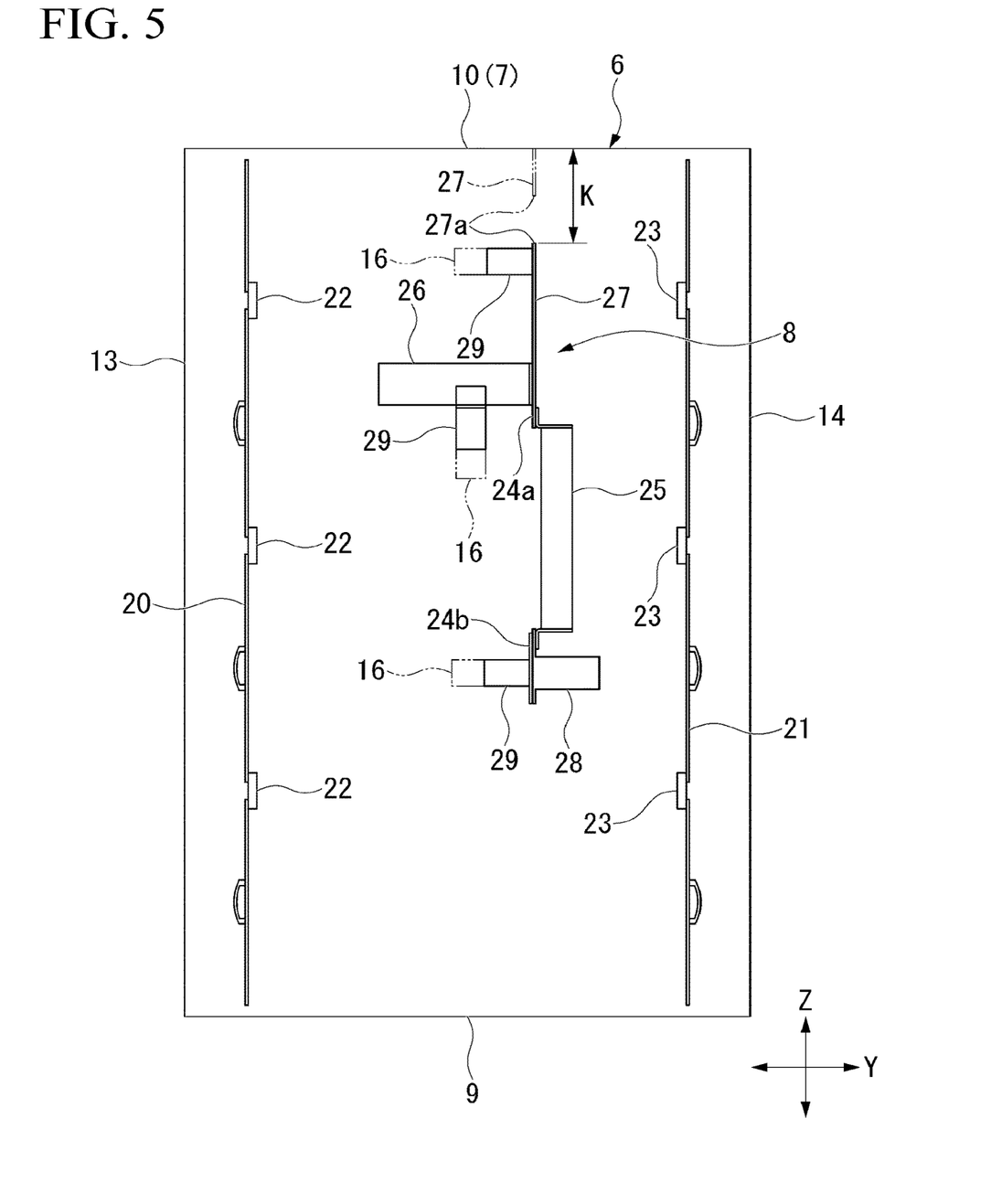
FIG. 5 is a view taken in the direction of the arrow A in FIG. 4.

FIG. 5 is a view taken in the direction of the arrow A in FIG. 4.

As shown in FIGS. 4 and 5, the fuse unit 8 is configured by three phase units 8U, 8V, and 8W (U-phase unit 8U, V-phase unit 8V, and W-phase unit 8W) so as to correspond to the external power supply 3. Since each phase unit 8U, 8V, 8W has the same configuration, each phase unit 8U, 8V, 8W is hereinafter collectively referred to as a fuse unit 8, and only one fuse unit 8 will be described.

The fuse unit 8 includes, as a main configuration, two plate-shaped connection conductors 24a and 24b (first connection conductor 24a and second connection conductor 24b) that extend along the Z direction and are separated from each other in the Z direction, a fuse 25 that is provided so as to straddle the connection conductors 24a and 24b and is connected to the two connection conductors 24a and 24b, an input conductor 26 that is connected to the upper side from the fuse 25 in the upper first connection conductor 24a among the two connection conductors 24a and 24b, a short-circuit induction conductor 27 that is connected to the upper end of the first connection conductor 24a and is disposed on the opposite side of the input conductor 26 from the fuse 25, and an external device connection conductor 28 that is connected to the lower side in the Z-direction from the fuse 25 of the lower second connection conductor 24b among the two connection conductors 24a and 24b.

The first connection conductor 24a is located near the head of the operator, and the second connection conductor 24b is located near the belly. Each of the connection conductors 24a and 24b is a highly conductive metal plate such as a copper plate. Hereinafter, a metal plate having high conductivity such as a copper plate will be described as a conductor.

The value of the fuse 25 is determined based on the magnitude of the supplied power and the specifications of the power converter 2. The fuse 25 is arranged at approximately the height of the operator's chest.

The input conductor 26 is a plate-shaped conductor extending from the first connection conductor 24a toward the front inner cover 20 and along the Y direction. The input conductor 26 is arranged at approximately the level of the operator's eye level. An unillustrated electric wire extending from the external power supply 3 is connected to the input conductor 26. As a result, the power of the external power supply 3 is supplied to the input conductor 26.

The first connection conductor 24a extends upward from the input conductor 26, and the extended portion serves as a short-circuit induction conductor 27. That is, the short-circuit induction conductor 27 is a rectangular plate-shaped conductor that is long in the Z direction when viewed from the Y direction.

The short-circuit induction conductor 27 is for guiding an arc flash generated in the fuse unit 8 (details will be described later). Since the short-circuit induction conductor 27 extends upward from the first connection conductor 24a, its distal end (upper end) 27a is arranged close to the top plate 10. A predetermined insulating distance is secured between the distal end 27a of the short-circuit induction conductor 27 and the top plate 10.

The external device connection conductor 28 is a plate-shaped conductor extending from the second connection conductor 24b toward the rear inner cover 21 and along the Y direction. An unillustrated electric wire extending from the power converter 2 is connected to the external device connection conductor 28. As a result, the power of the external power supply 3 is supplied to the power converter 2 via the protection relay device 4.

In the fuse unit 8 thus configured, an insulator 29 is provided at a position corresponding to the unit fixing bar 16 of the housing 6. Specifically, insulators 29 are provided at the lowermost portion of the connection conductor 24, the input conductor 26, and the short-circuit induction conductor 27, respectively. The fuse unit 8 is fixed to the unit fixing bar 16 via these insulators 29. Therefore, the unit fixing bar 16 and the fuse unit 8 are prevented from being short-circuited.

Next, the operation of the fuse unit 8 will be described.

For example, when a short circuit accident occurs in the protection relay device 4 or the power conversion device 2, an arc flash may occur. Since the downstream side of the fuse 25 (on the side of the power conversion device 2) is protected by the fuse 25, even if a short circuit occurs, an arc flash of high energy does not occur. On the other hand, there is no protection on the upstream side of the fuse 25 (on the side of the external power supply 3), and a high-energy arc flash is likely to occur when a short circuit occurs. Therefore, the short-circuit induction conductor 27 is provided on the side of the input conductor 26 opposite to the fuse 25 in the first connection conductor 24a, that is, on the upstream side of the fuse 25.

The short-circuit induction conductor 27 is extended in a plate shape, and its distal end 27a is arranged close to the top plate 10 while securing an insulation distance. If an arc flash occurs, it is likely to occur at the end of the conductor. Therefore, when an arc flash occurs, the arc flash occurs preferentially between the short-circuit induction conductor 27 and the top plate 10 (interval K).

The top plate 10 is a flapper portion 7. That is, when the arc flash occurs, the plastic screw fastening and fixing the lid portion 19 to the top plate 10 is broken by the pressure of the arc flash, and the lid portion 19 is opened (see an arrow Y in FIG. 3). Thereby, the pressure due to the arc flash is released to the outside of the housing 6 through the opening 18 of the top plate 10. This prevents the door 17 and the like of the housing 6 from being opened by the pressure of the arc flash.

A large opening is provided in the front surface 13 and the rear surface 14 to facilitate the operation in the housing 6. The door 17 and the rear outer cover (not shown) are necessarily weaker than others in order to ensure accessibility. Even if the arc flash can be induced and generated in the vicinity of the flapper portion, the arc flash may be damaged when the pressure due to the arc flash is transmitted directly to the door 17 or the rear outer cover (not shown). Accordingly, a front inner cover 20 is provided between the fuse unit 8 and the door 17. A rear inner cover 21 is provided between the fuse unit 8 and a rear outer cover (not shown).

The front inner cover 20 is provided between the fuse unit 8 and the door 17 so as to cover the entire surface of the housing 6. Thereby, the pressure of the arc flash is transmitted to the front inner cover 20 first. As a result, the pressure transmitted to the door 17 is reduced, and the door 17 is prevented from being opened.

The rear inner cover 21 is provided between the fuse unit 8 and a rear outer cover (not shown) so as to cover the entire surface of the housing 6. Thereby, the pressure of the arc flash is transmitted to the rear inner cover 21 first. As a result, the pressure transmitted to the rear outer cover (not shown) is reduced, and the rear outer cover is prevented from being opened.

Thus, in the above-described embodiment, the flapper portion 7 including the top plate 10 and the lid portion 19 of the housing 6 is provided. The fuse unit 8 provided in the housing 6 includes a short-circuit induction conductor 27 provided on the opposite side (upper side) of the fuse 25 of the input conductor 26 in the first connection conductor 24a. Thereby, when an arc flash occurs, the short-circuit induction conductor 27 can preferentially generate an arc flash between the short-circuit induction conductor 27 and the flapper portion 7. The pressure caused by the arc flash can be released to the outside of the housing 6 through the opening 18 of the flapper portion 7. Inside the housing 6, a front inner cover 20 and a rear inner cover 21 are provided. Thereby, the pressure due to the arc flash transmitted to the door 17 and the rear outer cover (not shown) can be reduced. Therefore, in order to increase the mechanical strength of the entire housing 6, the wall surface (the bottom surface 9, the top plate 10, the side surfaces 11, 12, the front surface 13, and the rear surface 14) and the door 17 of the housing 6 are not wastefully enlarged, and the standard regarding the arc flash of the power converter 2 can be satisfied.

Since the power converter 2 is protected by the protection relay device 4, even if a short circuit accident occurs inside the power converter 2, a high-energy arc flash does not occur. The protection relay device 4 is provided separately from the power conversion device 2, and is provided so as to be separated from the power conversion device 2. Therefore, if the standard for arc flash can be satisfied only with the protective relay device 4, it is not necessary to uselessly enlarge the power converter 2 to increase the mechanical strength of the entire power converter 2. Thereby, the power conversion system 1 as a whole can easily satisfy the arc flash standard and can be downsized. Only by changing the specifications of the protection relay device 4 according to the specifications of the power conversion device 2, the power conversion system 1 as a whole can easily satisfy the arc flash standard.

The first connection conductor 24a of the fuse unit 8 extends upward from the input conductor 26, and the extended portion serves as a short-circuit induction conductor 27. The short-circuit induction conductor 27 is arranged as close as possible to the top plate 10 (flapper portion 7) as long as the insulation distance can be ensured. With this configuration, an arc flash can be reliably generated in the vicinity of the flapper portion 7 with a simple structure. Thereby, the protection relay device 4 can be manufactured at low cost.

The flapper portion 7 includes a top plate 10, an opening 18 formed in the top plate 10, and a lid portion 19 that can open and close the opening 18. Therefore, the opening 18 can be opened according to the pressure of the arc flash, and the pressure due to the arc flash can be easily released to the outside of the housing 6 with a simple structure.

The flapper portion 7 is arranged at the top of the housing 6. In other words, the height of the flapper portion 7 is, for example, the height of the position of the operator's head. Thereby, even if an arc flash occurs, the arc flash can be generated at a location in the housing 6 where security is most easily ensured (a location corresponding to the standard relating to the arc flash).

The fuse 25 is arranged at approximately the height of the operator's chest. Thereby, the operator can easily replace the fuse 25 and provide the protection relay device 4 with excellent maintenance.

(Modification)

In the above-described embodiment, a case has been described in which, for example, two openings 18 are formed in the top plate 10 and two lid portions 19 that close each opening 18 are provided. However, the present invention is not limited to this, and at least one opening 18 may be formed in the top plate 10. The number of the openings 18 may be three or more. The number of the lid portions 19 may be determined according to the number of the openings 18.

In the above-described embodiment, the case where the lid portion 19 is rotatably attached to the top plate 10 via the hinge 30 has been described. The case where the lid portion 19 is fastened and fixed to the top plate 10 by a plastic screw (not shown) has been described. However, the present invention is not limited to this, and a plurality of slits may be formed in the top plate 10 in a perforated shape that can be divided, and a part of the top plate 10 may be plastically deformed and rolled up along the slits by the pressure at the time of arc flash. A part of the top plate 10 may be formed so as to have a lower strength than other parts, and a part having a lower strength may be plastically deformed and turned up by the pressure at the time of arc flash. As a means for reducing the strength, for example, there is a method of making the thickness of a desired portion of the top plate 10 thinner than other portions. For example, there is a method in which a plate material at a desired portion of the top plate 10 is a plate material having lower mechanical strength than other portions.

In the above-described embodiment, the case where the hinge portions 30 are arranged on both sides in the X direction of the top plate 10 has been described. Thereby, the case where the lid portion 19 is opened from the center in the X direction of the top plate 10 when the lid portion 19 is opened has been described. However, the present invention is not limited to this. The hinge portion 30 may be arranged at the center of the top plate 10 in the X direction, and the lid portion 19 may be opened from both sides in the X direction of the top plate 10 when the lid portion 19 is opened.

In the above-described embodiment, the case where the fuse unit 8 extends the first connection conductor 24a upward from the input conductor 26 and uses the extended portion as the short-circuit induction conductor 27 has been described. However, the present invention is not limited to this, and the first connection conductor 24a and the short-circuit induction conductor 27 may be configured separately. That is, the short-circuit induction conductor 27 extending in the Z direction may be attached to the upper end of the first connection conductor 24a.

In the above embodiment, the case where the short-circuit induction conductor 27 is provided on the first connection conductor 24a of the fuse unit 8 has been described. However, the present invention is not limited to this, and it may be provided on at least one of the first connection conductor 24a and the flapper portion 7. For example, when the short-circuit induction conductor 27 is provided on the flapper portion 7, the short-circuit induction conductor 27 is provided so as to protrude downward from either the top plate 10 or the lid portion 19 of the flapper portion 7 (see two-dot chain line in FIG. 5). Even in this case, the distance between the distal end 27a of the short-circuit induction conductor 27 and the connection conductor 24 (or the distal end 27a of the short-circuit induction conductor 27 extending from the connection conductor 24) needs to be set such that a predetermined insulation distance is secured.

In the above-described embodiment, the case where the short-circuit induction conductor 27 is a rectangular plate-shaped conductor that is long in the Z direction when viewed from the Y direction has been described. However, the shape is not limited to this, and any shape may be used as long as it can guide a location where an arc flash occurs.

Figure 6:
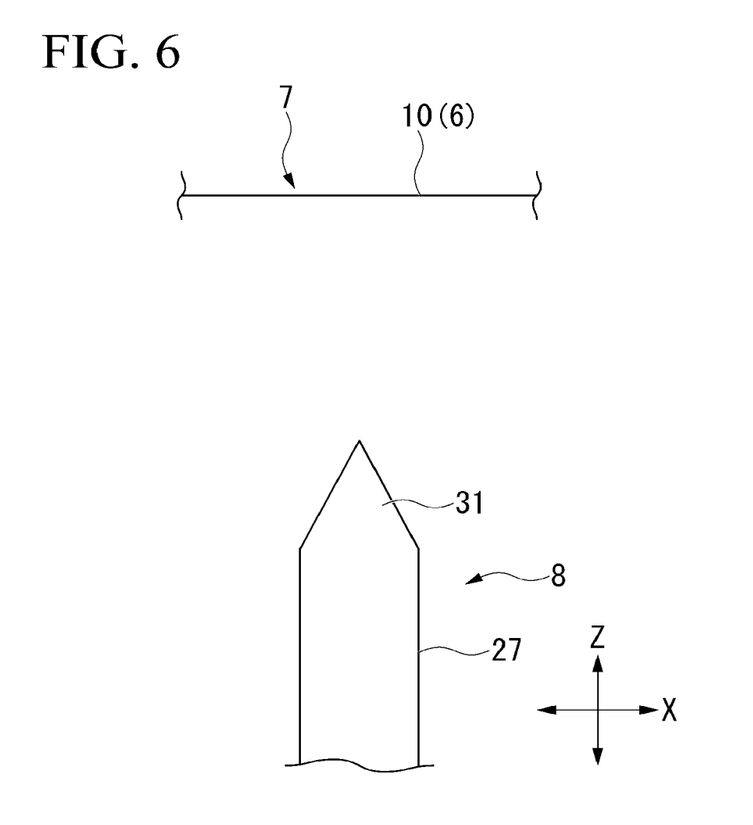
FIG. 6 is a plan view of a short-circuit induction conductor according to a modified example.

For example, as shown in FIG. 6, the short-circuit induction conductor 27 may have a tapered portion 31 that is tapered upward (toward the top plate 10). With this configuration, when an arc flash occurs, the arc flash can be more reliably generated between the short-circuit induction conductor 27 and the flapper portion 7.

In the above-described embodiment, the case where the metal front inner cover 20 is provided inside the housing 6 inside the front surface 13 in the Y direction has been described. The case in which the metal rear inner cover 21 is provided inside the housing 6 inside the rear surface 14 in the Y direction has been described. However, the present invention is not limited to these. If at least a part between the housing 6 and the fuse unit 8 is provided with an internal cover that separates the housing 6 and the fuse unit 8, the pressure applied to the housing 6 can be reduced by the arc flash.

In the above embodiment, the case where the height of the top plate 10 in the housing 6 is, for example, the height of the position of the head of the operator has been described. The case where the first connection conductor 24a is located near the head of the operator and the second connection conductor 24b is located near the belly has been described. The case where the fuse 25 is arranged at substantially the height of the operator's chest has been described. However, the present invention is not limited thereto, and the top plate 10, the first connection conductor 24a, and the fuse 25 can be located at various heights and positions according to the specifications of the protection relay device 4.

In addition, for example, a wire mesh (not shown) may be provided on the flapper portion 7 from above the lid portion 19. With this configuration, it is possible to reliably prevent the fragments of the internal component that are unintentionally damaged due to the pressure of the arc flash from scattering.

According to at least one embodiment described above, the flapper portion 7 including the top plate 10 and the lid portion 19 of the housing 6 is provided. The fuse unit 8 provided in the housing 6 includes a short-circuit induction conductor 27 provided on the opposite side (upper side) of the fuse 25 of the input conductor 26 in the first connection conductor 24a. Therefore, when an arc flash occurs, the short-circuit induction conductor 27 can preferentially generate an arc flash between the short-circuit induction conductor 27 and the flapper portion 7. The pressure caused by the arc flash can be released to the outside of the housing 6 through the opening 18 of the flapper portion 7. Therefore, in order to increase the mechanical strength of the entire housing 6, the standard for the arc flash of the protective relay device 4 can be satisfied without unnecessarily increasing the size of the wall surface (the bottom surface 9, the top plate 10, the side surfaces 11, 12, the front surface 13, and the rear surface 14) and the door 17 of the housing 6.

Since the power converter 2 is protected by the protection relay device 4, even if a short circuit accident occurs inside the power converter 2, a high-energy arc flash does not occur. The protection relay device 4 is provided separately from the power conversion device 2, and is provided so as to be separated from the power conversion device 2. Therefore, if the standard for arc flash can be satisfied only with the protective relay device 4, it is not necessary to uselessly enlarge the power converter 2 to increase the mechanical strength of the entire power converter 2. Thereby, the power conversion system 1 as a whole can easily satisfy the arc flash standard and can be downsized. Only by changing the specifications of the protection relay device 4 according to the specifications of the power conversion device 2, the power conversion system 1 as a whole can easily satisfy the arc flash standard.

The connection conductor 24 of the fuse unit 8 extends upward from the input conductor 26, and the extended portion becomes a short-circuit induction conductor 27. The short-circuit induction conductor 27 is arranged as close as possible to the top plate 10 (flapper portion 7) as long as the insulation distance can be ensured. With this configuration, an arc flash can be reliably generated in the vicinity of the flapper portion 7 with a simple structure. Thereby, the protection relay device 4 can be manufactured at low cost.

The flapper portion 7 includes a top plate 10, an opening 18 formed in the top plate 10, and a lid portion 19 that can open and close the opening 18. Therefore, the opening 18 can be opened according to the pressure of the arc flash, and the pressure due to the arc flash can be easily released to the outside of the housing 6 with a simple structure.

The flapper portion 7 is arranged at the top of the housing 6. In other words, the height of the flapper portion 7 is, for example, the height of the position of the operator's head. Thereby, even if an arc flash occurs, the arc flash can be generated at a location in the housing 6 where security is most easily ensured (a location corresponding to the standard relating to the arc flash).

The fuse 25 is arranged at approximately the height of the operator's chest. Thereby, the operator can easily replace the fuse 25 and provide the protection relay device 4 with excellent maintenance.

Although several embodiments of the present invention have been described, these embodiments are provided by way of example and are not intended to limit the scope of the invention. These embodiments can be implemented in other various forms, and various omissions, replacements, and changes can be made without departing from the spirit of the invention. These embodiments and their modifications are included in the scope and gist of the invention, and are also included in the invention described in the claims and equivalents thereof.

REFERENCE SIGNS LIST

1: Power conversion system, 2: Power conversion device (External device), 3: External power supply, 4: Protection relay device, 6: Housing, 7: Flapper portion, 8: Fuse unit, 8U: U-phase unit (Fuse unit), 8V: V-phase unit (Fuse unit), 8W: W-phase unit (Fuse unit), 10: Top plate (Wall surface), 18: Opening, 19: Lid portion, 24a: First connection conductor (Connection conductor), 24b: Second connection conductor (Connection conductor), 25: Fuse, 26: Input conductor, 27: Short-circuit induction conductor, 28: External device connection conductor, 31: Tapered portion

The invention claimed is:

1. A protection relay device comprising:
a housing;
a flapper portion provided on the housing and capable of communicating between inside and outside of the housing; and
a fuse unit provided in the housing,
wherein the fuse unit includes:
a connection conductor;
an input conductor connected to the connection conductor and to which an external power is input;
a fuse connected to the connection conductor; and
an external device connection conductor connected to the fuse on a side opposite to the input conductor, and to which an external device is connected,
a short-circuit induction conductor is provided on at least one of the input conductor on a side opposite to the fuse and the flapper portion, the short-circuit induction conductor protruding toward the other of the input conductor and the flapper portion, and
the short-circuit induction conductor is provided on the input conductor on a side opposite to the fuse, and is disposed adjacent to the flapper portion.

2. The protection relay device according to claim 1, wherein the short-circuit induction conductor has a tapered portion that is tapered toward the other of the input conductor and the flapper portion.

3. The protection relay device according to claim 1, wherein the flapper portion includes:
a wall surface;
an opening formed in the wall surface; and
a lid portion rotatably provided with respect to the wall surface, and configured to close up the opening.

4. The protection relay device according to claim 1, comprising
an internal cover provided at least in part between the housing and the fuse unit, and configured to separate the housing and the fuse unit.

5. The protection relay device according to claim 1, wherein the flapper portion is disposed at a top of the housing.

6. A power conversion system comprising:
the protection relay device according to claim 1, and
a power converter that is connected to the external power through the protection relay device and is the external device.

* * * * *